United States Patent
Arnoult, Jr. et al.

(10) Patent No.: US 7,710,827 B1
(45) Date of Patent: May 4, 2010

(54) METHODS AND SYSTEMS FOR CONDUCTING NEAR-FIELD SOURCE TRACKING

(75) Inventors: Kenneth M. Arnoult, Jr., Fairbanks, AK (US); John V. Olson, Fairbanks, AK (US); Curt A. L. Szuberla, Fairbanks, AK (US)

(73) Assignee: University of Alaska, Fairbanks, AK (US)

( * ) Notice: Subject to any disclaimer, the term of this patent is extended or adjusted under 35 U.S.C. 154(b) by 178 days.

(21) Appl. No.: 11/832,051

(22) Filed: Aug. 1, 2007

Related U.S. Application Data (60) Provisional application No. 60/821,075, filed on Aug. 1, 2006.

(51) Int. Cl.
*G01S 5/28* (2006.01)

(52) U.S. Cl. .................................................. 367/127

(58) Field of Classification Search ............... 367/127, 367/135, 136; 342/107, 108, 195
See application file for complete search history.

(56) References Cited

U.S. PATENT DOCUMENTS

| | | | |
|---|---|---|---|
| 5,175,710 A * | 12/1992 | Hutson .................. | 367/135 |
| 5,625,348 A | 4/1997 | Farnsworth et al. | |
| 6,178,141 B1 | 1/2001 | Duckworth et al. | |
| 6,570,500 B1 | 5/2003 | Pieper | |
| 6,792,118 B2 | 9/2004 | Watts | |
| 2002/0172307 A1 | 11/2002 | Sandberg | |
| 2003/0033094 A1 | 2/2003 | Huang | |
| 2004/0085241 A1 | 5/2004 | Arikan et al. | |
| 2005/0060142 A1 | 3/2005 | Visser et al. | |
| 2005/0089124 A1 | 4/2005 | Valle | |

OTHER PUBLICATIONS

Smith, et al.; "Closed-Form Least-Squares Source Location Estimation from Range-Difference Measurements"; IEEE Transactions on Acoustics, Speech, and Signal Processing; vol. ASSP-35; No. 12; Dec. 1987; pp. 1661-1669.

Chen, et al.; "Maximum-Likelihood Source Localization and Unknown Sensor Location Estimation for Wideband Signals in the Near-Field"; IEEE Transactions on Signal Processing; vol. 50; No. 8; Aug. 2002; pp. 1843-1854.

Grosicki, et al.; "A Weighted Linear Prediction Method for Near-Field Source Localization"; IEEE International Conference on Acoustics, Speech, and Signal Processing; May 13-17, 2002; pp. 2957-2960.

Hu, et al.; "Eigen-structure Based Near-Field Wideband Sources Localization"; Acoust. Sci. & Tech.; vol. 23; No. 5; 2002; pp. 267-274.

(Continued)

*Primary Examiner*—Dan Pihulic
(74) *Attorney, Agent, or Firm*—Ballard Spahr LLP (57) ABSTRACT

Methods and systems are provided herein for signal source tracking. A signal emitted over time from a moving source is a collection of small sub-signals that were emitted by the source at different positions along its path. If the source is traveling at a slower speed than the signal, the sub-signals will arrive at a given sensor in the same order that they were released. By identifying the locations and times of the releases of several of these sub-signals, the path and velocity of the moving source can be estimated.

19 Claims, 7 Drawing Sheets

OTHER PUBLICATIONS

Kabaoglu, et al.; "Maximum Likelihood 3-D Near-Field Source Localization Using the EM Algorithm"; Proceedings of the Eighth IEEE International Symposium on Computers and Communication; 2003; pp. 1-6.

Schau, et al.; "Passive Source Localization Employing Intersecting Spherical Surfaces from Time-of-Arrival Differences"; IEEE Transactions on Acoustics Speech, and Signal Processing; vol. ASSP-35; No. 8, Aug. 1987; pp. 1223-1225.

Kozick, et al.; "Near-Field Localization of Acoustic Sources with Imperfect Spatial Coherence, Distributed Processing, and Low Communication Bandwidth"; Proceedings of SPIE; vol. 4393; 2001; pp. 52-63.

Cavaco, et al.; "A Biologically Plausible Acoustic Azimuth Estimation System"; Proceedings of the Workshop on Computational Auditory Scene Analysis (CASA 99) of the International Joint Conference on Artificial Intelligence (IJCAI 99); Aug. 1999; pp. 78-86.

Obata, et al.; "A New Sound Source Location Algorithm Based on Formant Frequency for Sound Image Localization"; International Conference on Multimedia and Expo; IEEE; 2003; pp. 729-732.

Lee, et al.; "An Extended Zero-crossing Method for Ultrasonic Velocity Measurements"; Journal of the Acoustical Society of Japan (E); vol. 16; No. 6; Nov. 1995; 1 page.

Huang et al.; "Sound Localization of Concurrent and Continuous Speech Sources in Reverberant Environment"; IEEE ASSP Workshop on Applications of Signal Processing to Audio and Acoustics; Oct. 19-22, 1997; pp. 1-4.

Venezia, et al.; "Test and Evaluation of a Midwater Three Dimensional Underwater Tracking Array"; Engineering in Harmony with the Ocean Proceedings vol. II; 1993; pp. 490-493.

Vestrheim, et al.; "Transit Time Determination in a Measurement System, With Effects of Transducers"; IEEE Ultrasonics Symposium; Nov. 3-6, 1996; pp. 665-668.

* cited by examiner

METHODS AND SYSTEMS FOR CONDUCTING NEAR-FIELD SOURCE TRACKING

CROSS REFERENCE TO RELATED PATENT APPLICATIONS

This application claims priority to U.S. Provisional Application No. 60/821,075 filed Aug. 1, 2006, herein incorporated by reference in its entirety.

GOVERNMENT SUPPORT CLAUSE

This invention was made with government support under IIS0433392 awarded by the National Science Foundation. The government has certain rights in the invention.

BACKGROUND

Tracking a moving signal source by passive methods has been difficult due to the Doppler shift that is introduced into the observations of each sensor. In general, the size of the Doppler shift varies in time as the source moves, and the amount of Doppler shift is not the same in observations made from different locations. Therefore, Doppler shifting cannot simply be removed from the data. Methods for tracking a signal source that account for Doppler shifting are needed.

SUMMARY

The systems and methods provided overcome the complications of Doppler shifting in signal source tracking. The signal emitted over time from a moving source is a collection of small sub-signals that were emitted by the source at different positions along its path. If the source is traveling at a slower speed than the signal, the sub-signals will arrive at a given sensor in the same order that they were released. By identifying the locations and times of the releases of several of these sub-signals, the path and velocity of the moving source can be estimated.

Additional advantages of the methods and systems will be set forth in part in the description which follows or may be learned by practice of the methods and systems. The advantages of the methods and systems will be realized and attained by means of the elements and combinations particularly pointed out in the appended claims. It is to be understood that both the foregoing general description and the following detailed description are exemplary and explanatory only and are not restrictive of the methods and systems, as claimed.

BRIEF DESCRIPTION OF THE DRAWINGS

The accompanying drawings, which are incorporated in and constitute a part of this specification, illustrate embodiments of the methods and systems and together with the description, serve to explain the principles of the methods and systems.

DETAILED DESCRIPTION

Before the present methods and systems are disclosed and described, it is to be understood that the methods and systems are not limited to specific methods or specific components. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present methods and systems may be understood more readily by reference to the following detailed description of preferred embodiments of the methods and systems and the Examples included therein and to the Figures and their previous and following description.

I. Systems

Provided are embodiments of systems for tracking a signal source. For example, in one aspect, the system can comprise a plurality of sensors, for example four sensors, (with no maximum limit) in communication with a tracking unit. More than four sensors can be in communication with the tracking unit. For example, the system can comprise 4, 5, 6, 7, 8, 9, 10, 11, 12, 13, 14, 15 sensors and the like. The tracking unit can comprise a sensor data receiving unit, a signal labeling unit, a location and time determination unit, and a path and velocity determination unit.

Figure 1:
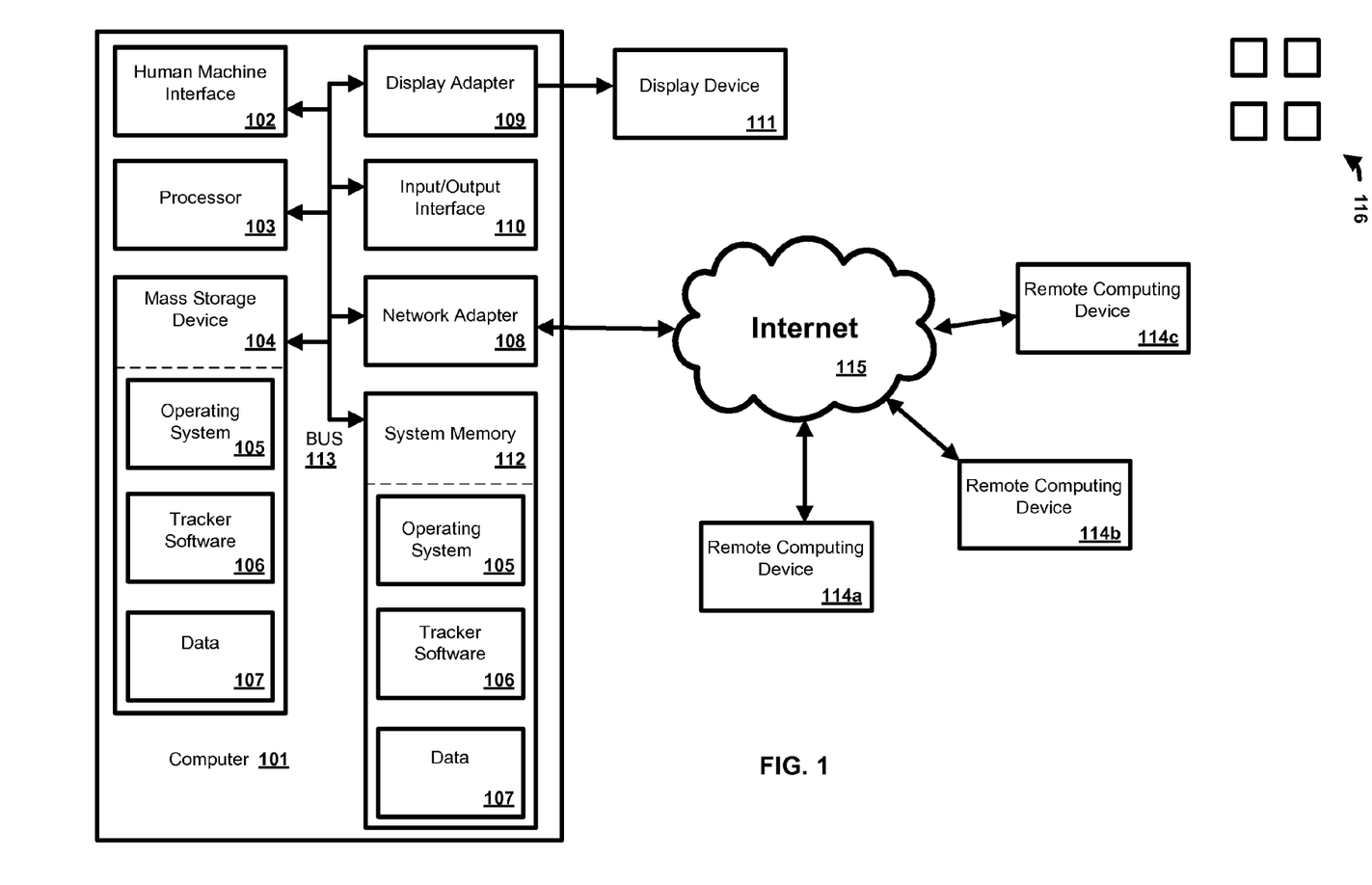
FIG. 1 is an exemplary operating environment.

The system above has been described as comprised of units. One skilled in the art will appreciate that this is a functional description and that the respective functions can be performed by software, hardware, or a combination of software and hardware. A unit can be software, hardware, or a combination of software and hardware. For example, the units can comprise components of Tracker Software 106 as illustrated in FIG. 1 and described below. In one exemplary aspect, the units can comprise a computer 101 as illustrated in FIG. 1 and described below. The units can be located in one apparatus or can be in communication from separate locations.

FIG. 1 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

In another aspect, the methods and systems can be described in the general context of computer instructions, such as program modules, being executed by a computer. Generally, program modules comprise routines, programs, objects, components, data structures, etc. that perform particular tasks or implement particular abstract data types. The methods and systems can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 113, and all buses specified in this description can also be implemented over a wired or wireless network connection and each of the subsystems, including the processor 103, a mass storage device 104, an operating system 105, Tracker software 106, data 107, a network adapter 108, system memory 112, an Input/Output Interface 110, a display adapter 109, a display device 111, and a human machine interface 102, can be contained within one or more remote computing devices 114*a,b,c* at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as data 107 and/or program modules such as operating system 105 and Tracker software 106 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and Tracker software 106. Each of the operating system 105 and Tracker software 106 (or some combination thereof) can comprise elements of the programming and the Tracker software 106. Data 107 can also be stored on the mass storage device 104. Data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, and the like. These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110.

The computer 101 can operate in a networked environment using logical connections to one or more remote computing devices 114*a,b,c*. By way of example, a remote computing device can be a personal computer, portable computer, a server, a router, a network computer, a peer device or other common network node, and so on. Logical connections between the computer 101 and a remote computing device 114*a,b,c* can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of Tracker software 106 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In another aspect, sensors 116 can be located locally or remote from computer 101 and/or remote computing devices 114*a,b,c*. Sensor 116 can be any type of sensor capable of receiving a signal. For example, sensors 116 can be, thermal, electromagnetic, mechanical, chemical, optical, acoustic, motion, orientation, and the like, as are known to one of ordinary skill in the art. The sensors 116 can communicate received signals and other information related to received signals by any means known in the art. For example, sensors 116 can transmit data through a wired connection or through a wireless connection such as satellite, radio, cellular, and the like. Thus, the sensors 116 can communicate data to, and received data from, computer 101 and/or remote computing devices 114*a,b,c*.

II. Methods

A. Generally

Provided herein are methods for estimating both the path traversed by a moving source and the source's velocity along its path. The methods are passive techniques based on analysis of time-of-flight information that is deduced from signals received by a sensor array. This differs from active techniques such as radar that reflect a manufactured signal off of the object it is monitoring. Furthermore, the methods provided do not require that the signal be infrasonic. The methods are applicable to any wave field, including but not limited to, acoustic and electro-magnetic waves. The methods can be applied to sources traveling slower than the signal speed. The methods do not impose any restrictions on the configuration of the array of sensors or the number of sensors. Signal sources can be tracked when the signal source is outside the array and when the source is within the array. The methods account for constant uniform medium motion, for example, wind and currents.

The methods disclosed are based on several broad assumptions that greatly reduce mathematical complexity and computational time. It is assumed that at each instant, the source emits the same signal signature in all directions. It is further assumed that the speed of the source is less than the speed of signal propagation in the medium and that the source is much smaller than the aperture of the sensor array. It is also assumed that signals arrive at each sensor along direct "line of sight" paths from the source and that the signal medium is isotropic. Lastly, it is assumed that the segment of data containing the signal has a high signal to noise ratio (S/N). In the presence of noise, finding the parts of received signals that were emitted during the same events becomes a more difficult task. For instance, two sensors might not record the same number of zero crossings during a noisy interval. An analyst can find the corresponding parts within the sensors' received signals or the process can be automated.

Tracking a moving signal source by passive methods has been difficult due to the Doppler shift that is introduced into the observations of each sensor. In general, the size of the Doppler shift varies in time as the source moves, and the amount of Doppler shift is not the same in observations made from different locations. Therefore, Doppler shifting can not simply be removed from the data.

Figure 2:
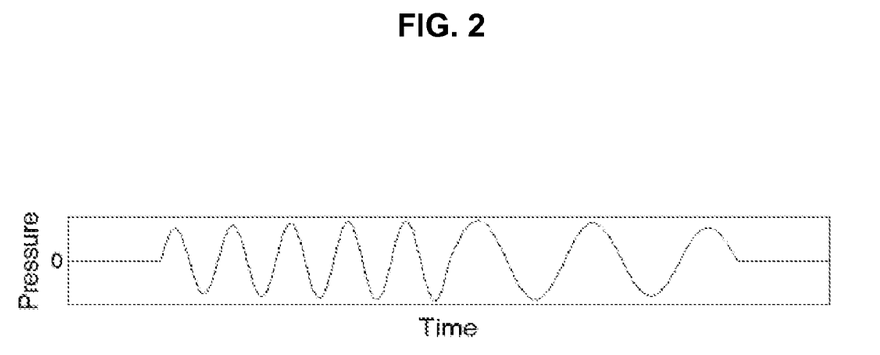
FIG. 2 is a representation of an acoustic signal received by a sensor from a moving source.

The methods provided overcome the challenges associated with Doppler shifting. The signal emitted over time from a moving source is a collection of small sub-signals that were emitted by the source in a series of events at different positions along its path. If the source is traveling at a slower speed than the signal, the sub-signals will arrive at a given sensor in the same order that they were released. By identifying the locations and times of the events that produced several of these sub-signals, the path and velocity of the moving source can be estimated. For example, if an ambulance were to drive through an array of acoustic sensors and turn on its siren for a brief period while in motion, one sensor of the array might receive a signal as seen in FIG. 2. FIG. 2 is a representation of an acoustic signal received by a sensor from a moving source. Every part of this received signal was released by the ambulance at a different position along its path.

Figure 3A:
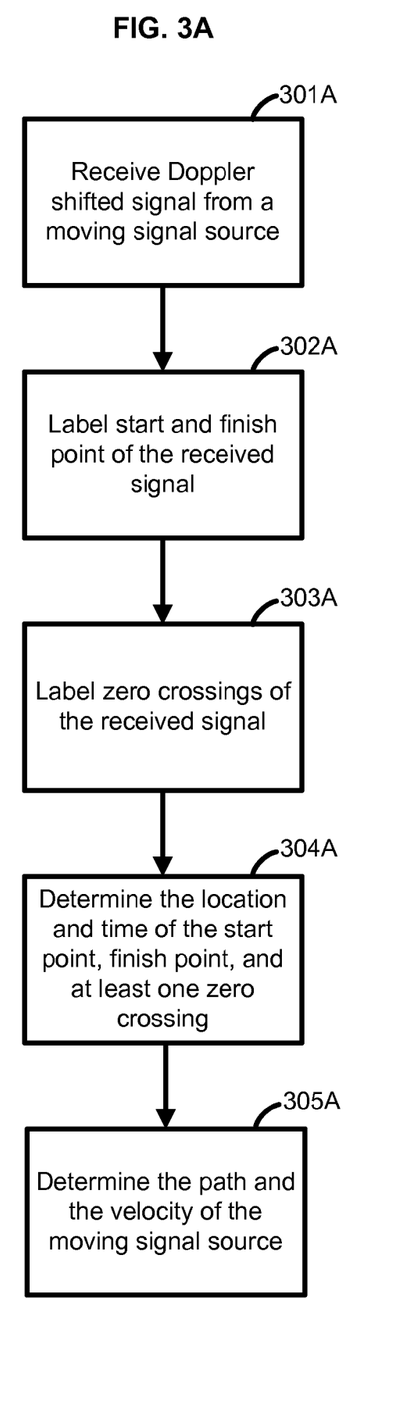
FIG. 3A illustrates exemplary steps of an embodiment of the methods.
Figure 4:
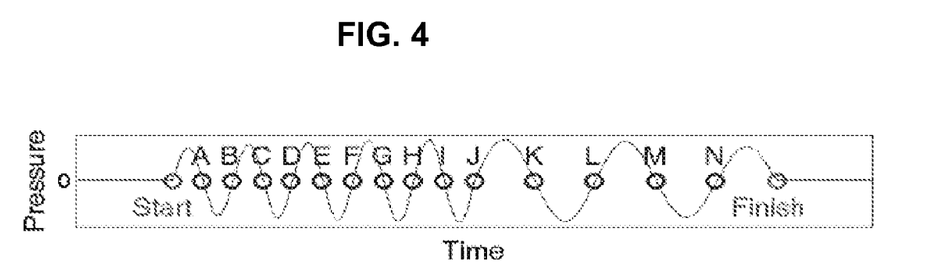
FIG. 4 is a labeled representation of an acoustic signal received by a sensor from a moving source.

FIG. 3A illustrates exemplary steps of an embodiment of the methods. At block 301A, a sensor array receives a Doppler shifted signal from a moving signal source. The start and finish point of the received signal is labeled at block 302A. FIG. 4 is a labeled representation of an acoustic signal received by a sensor from a moving source. Various parts of the signal are labeled and correspond to different events along an ambulance's path. For instance, the points labeled as "Start" and "Finish" in FIG. 4 correspond to the arrival of the parts of the signal that were released just after the ambulance's siren was turned on and just before the siren was turned off, respectively. Returning to FIG. 3A, at block 303A, the zero crossings of the received signal are labeled. Also labeled in FIG. 4 (A through N) are the places where the received signal crosses through the value of zero pressure ("zero crossings").

These "zero crossings" correspond to arrivals of parts of the signal that were released by the ambulance in a series of events at different locations along its journey while the siren was on. As long as the source is not traveling faster than the speed of the signal (the speed of sound in this example), these parts of the signal will arrive at each sensor in the array in the same order that they were released. However, the size of the Doppler shift will differ from sensor to sensor in the array. Zero crossings are useful for many reasons. One reason is that the slope of the received signal is usually most extreme at the zero crossings. This tends to minimize the error associated with measuring the times at which they occur. Another important reason is that the zero crossings are easily identifiable in the observations of all sensors. In the absence of noise and of other signals, each sensor should record the same number of zero crossings.

Figure 5:
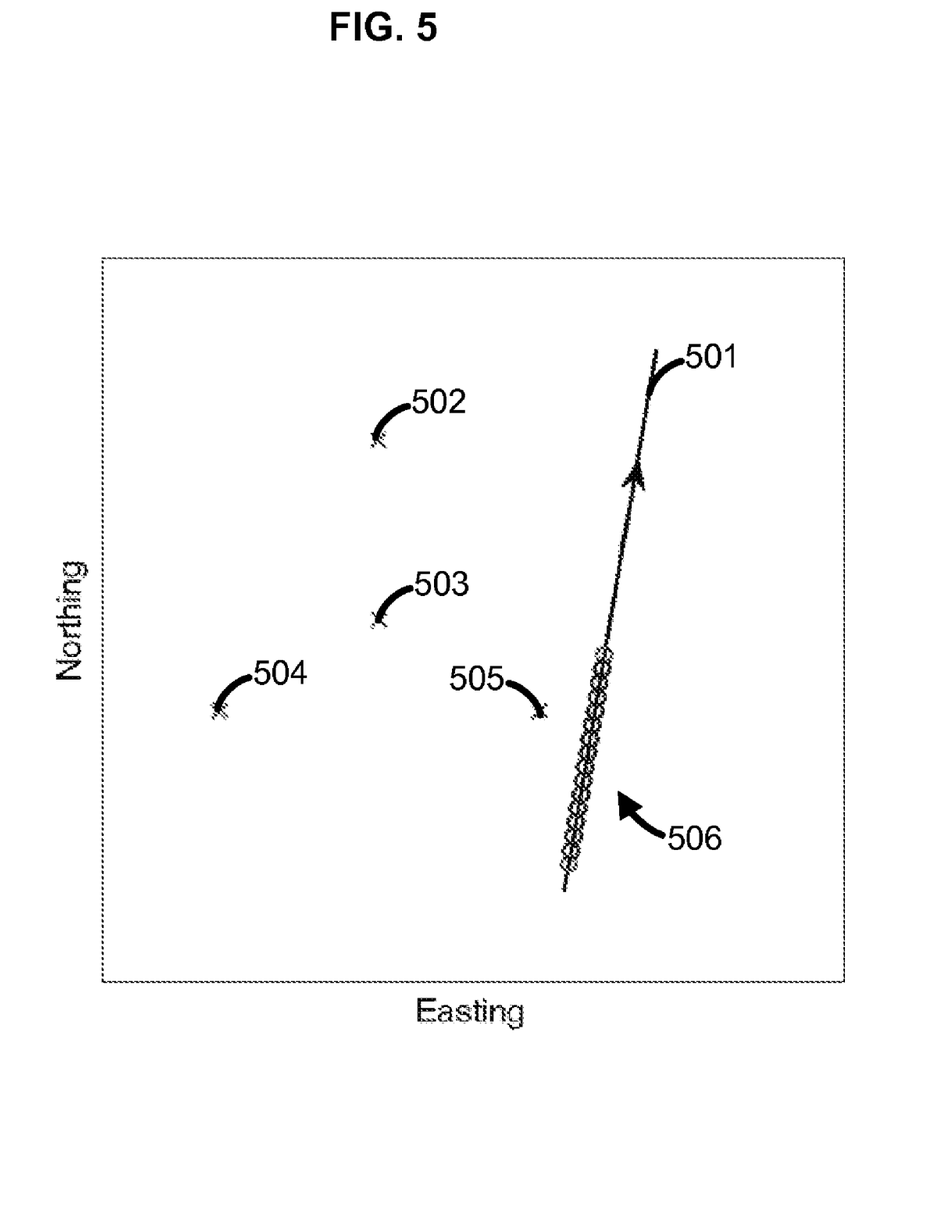
FIG. 5 illustrates the path of a signal source.

After repeating the same labeling scheme for the other sensors' measurements, it is possible to estimate the location and time of each event that produced each labeled part of the received signals. By knowing the locations of the sensors and the times that each sensor recorded the part of the signal labeled "Start," an estimate is made of the time and of the place from which that part of the signal was released. This same process is repeated sequentially for the other labeled parts of the received signals. This process results in a set of points that lie along the path of the ambulance (FIG. 5) and a set of times corresponding to when the ambulance was located at each point. From this the ambulance's average velocity between points can be calculated. FIG. 5 illustrates the path of a signal source (line 501) passing by an array of sensors (502, 503, 504, 505). Displayed along the path are a set of points (506) that are the determination of the source's path over a given segment.

Returning to FIG. 3A, the location and time of the start point, finish point, and at least one zero crossing is determined at block 304A. The more zero crossing points that have locations and times determined, the more accurate the path determination.

At block 305A, the path and the velocity of the moving signal source is determined. The path and velocity is determined from the locations and times determined in block 304A. Methods by which event locations can be estimated, a "Source Locator," are described in U.S. patent application Ser. No. 11/291,497, herein incorporated by reference in its entirety. The Source Locator is able to provide an estimate of an event location and a signal speed, but not an estimate of an event time or a source velocity. However, an event time and a source velocity can be estimated once the results from the Source Locator have been provided.

Event times can be estimated by subtracting the time-of-flights of the signal's parts from the times the signal's parts arrived at a sensor (EQ. 1).

$$\text{(Event time)} = \text{(Time of detection)} - \text{(Time-of-flight)} \quad (1)$$

The time of detection can simply be the time that any particular part of the signal (e.g. a "zero crossing") was detected. The time-of-flight (in the presence of a constant and uniform motion of the medium such as wind) for any particular part of the signal can be estimated by the following equation:

$$TOF = \frac{W^T X + \sqrt{(W^T X)^2 - (W^T W - c^2)(X^T X)}}{c^2 - W^T W} \quad (2)$$

where $$X = \begin{bmatrix} x_e - x_i \\ y_e - y_i \\ z_e - z_i \end{bmatrix} \quad W = \begin{bmatrix} w_x \\ w_y \\ w_z \end{bmatrix}$$

In the above equation $A^T$ represents the transpose of A, the signal speed is symbolized by the letter "c," the location of the event is denoted by $(x_e, y_e, z_e)$, the location of the $i^{th}$ sensor is denoted by $(x_i, y_i, z_i)$, and the vector components of the winds (or any other constant and uniform medium motion) are represented by $w_x$, $w_y$, and $w_z$. Note that if no wind is present all of the wind's vector components ($w_x$, $w_y$, and $w_z$) take on the value of zero, and EQ. 2 reduces to the equation "time=distance/speed." EQ 2 can also be applied to 2-D (planar) cases by setting the $3^{rd}$ element in both the W and X vectors equal to zero. The time of an event can be estimated for each sensor in the array, thus creating a distribution of event time estimates. This distribution can be reduced to a single value by way of standard statistical methods (e.g. mean, median, etc.).

The source's velocity can be estimated from the event times and the event locations. For example, the average velocity of the source between any two events can be estimated by dividing the displacement between the events by the time elapsed between events. For any two events j and k, the average velocity of the source in moving from j to k can be expressed in the following equation:

$$\vec{v}_{av} = \frac{\vec{r}_k - \vec{r}_j}{t_k - t_j} \quad (3)$$

where $\vec{r}_k$ and $\vec{r}_j$ represent the position vectors of events k and j, respectively, and $t_k$ and $t_j$ represent the times of events k and j, respectively. A method to estimate the source's velocity as a function of time is to repeatedly apply EQ. 3 to all consecutive events.

Figure 3B:
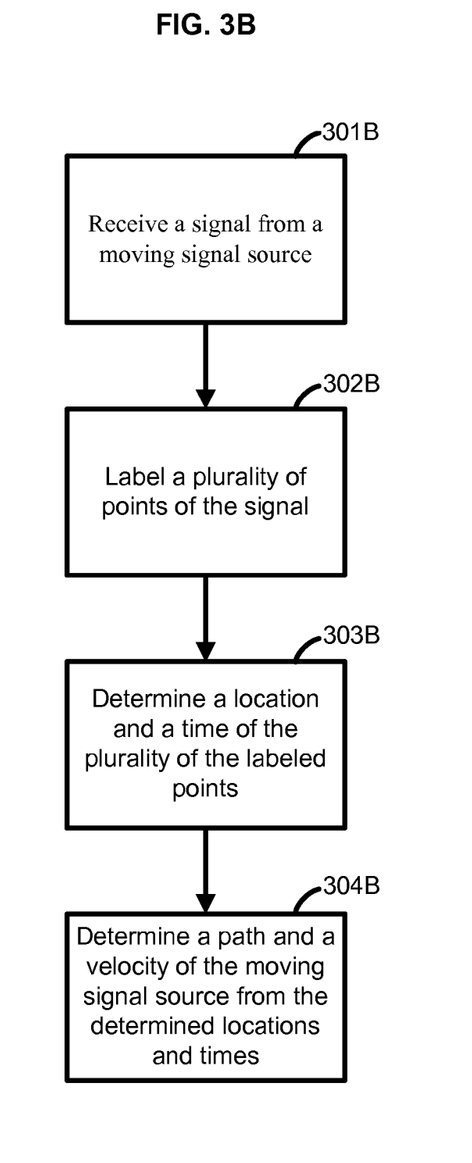
FIG. 3B illustrates exemplary steps of another embodiment of the methods.

FIG. 3B illustrates exemplary steps in another embodiment of the methods for signal tracking. At block 301B, a signal from a moving signal source can be received. Then, at block 302B, a plurality of points of the signal can be labeled. A location and a time of the plurality of the labeled points can be determined at block 303B. Finally, a path and a velocity of the moving signal source can be determined at block 304B from the determined locations and times. The signal can be, for example, a Doppler shifted signal. The signal can also be, for example, an infrasonic, acoustic, electro-magnetic signal, and the like.

Labeling the plurality of points of the signal can comprise labeling a start point, a finish point, and at least one zero crossing. The at least one zero crossing can be a point where the received signal crosses through a value of zero pressure.

The signal can be received at a sensor array. The sensor array can comprise a plurality of sensors, for example, four sensors. The methods can further comprise repeating steps 301B-303B for each sensor in the sensor array.

Determining a location and time of the labeled points can comprise determining a location and time for each of the start point, the finish point, and the at least one zero crossing.

B. Source Locator i. Methods

Figure 6:
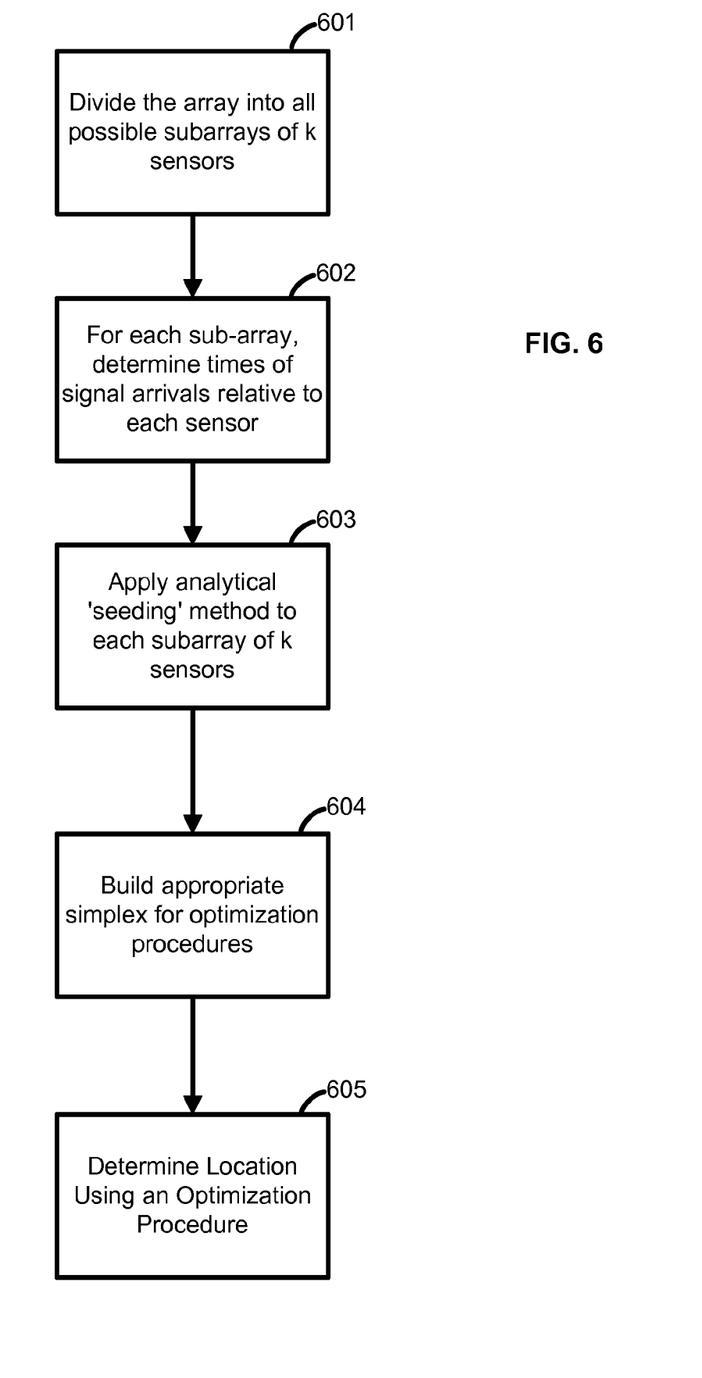
FIG. 6 illustrates exemplary steps in a method for determining a location and a time of a signal source.

FIG. 6 illustrates exemplary steps in a method for determining a location and a time of a signal source using an array of four sensors. The method can receive as input, geographic coordinates of sensor locations, where n is the number of sensors. The geographic coordinates can be in a matrix organized as a row of column vectors containing the easting and northing of each sensor relative to some origin. Another input can be the column vector of time delays, given by EQ. 4.

The method begins by dividing the array of n sensors into all possible sub-arrays of k sensors at block 601. Then the method determines the time delays between the signal's arrival at all non-redundant pairs of sensors within each sub-array at 602. The time delay between a part of the signal's arrival at any 2 sensors i and j ($\Delta t_{ij}$) can be calculated directly by subtracting the times of detection as measured by sensors i and j. In order to better approximate the times of detection, a standard curve fitting technique can be applied. This process is repeated for all non-redundant pairs of sensors in the array and the results are recorded in a column vector, $\tau$, given by the following equation:

$$\tau = [\Delta t_{12} \, \Delta t_{13} \ldots \Delta t_{(1)(n)} \, \Delta t_{23} \ldots \Delta t_{(2)(n)} \ldots \Delta t_{34} \ldots \Delta t_{(n-1)(n)}]^T, \quad (4)$$

where $X^T$ represents the transpose of the vector X. Note that for an n-element array the dimension of the vector is [n(n−1)/2,1].

Then the method applies an analytical 'seeding' method at block 603, described in further detail below. The purpose of the seeding method is to provide a starting point, or seed, from which an optimization procedure can later be launched. However, since the seeding method is analytical, it can only be applied to a very specific number of sensors, k. For example, k can be 4. Therefore, the seeding method is applied to every combination of k sensors within the original n-sensor array. The number of combinations containing k sensors that can be constructed from n sensors is $$\frac{n!}{k!(n-k)!}.$$

The value of k will depend on the characteristics of the array and the medium; this topic will be discussed later in further detail.

Estimations of source location are determined for all possible k-sensor groups within an array of n sensors. Since, in general, the time delays of EQ. 4 can each be measured quantities, for any given group of k sensors, there can be k unique realizations of the seeding method locations, by taking, in turn, each of the k sensors to be the reference sensor of the group. Each of the seeding method solutions can be calculated using straightforward linear algebraic techniques, culminating in the solution of either a cubic or quartic equation in the trace speed squared. There exists the possibility of having as many as three real solutions to the cubic equation and four real solutions to the quartic equation. In the case that there is no noise present, at least one location solution from all solution sets will be identical. However, in practice noise is ubiquitous, so for an array of n sensors, there can be as many as $$3\left(\frac{n!}{(k-1)!(n-k)!}\right)$$

solutions from the variants of the seeding methods that solve a cubic equation and $$4\left(\frac{n!}{(k-1)!(n-k)!}\right)$$

solutions from the variants that solve a quartic solution. For certain groups of k sensors, only a single real solution can be found among the three-fold or four-fold roots. These solutions from the sub-arrays can be used to initiate an optimization procedure which estimates a solution from all sensors in the array.

The Nelder-Mead optimization procedure, as known in the art, is practical for this purpose due to its independence of derivatives of merit functions (the functions for which maximum values are being sought). However, Powell's method, as known in the art, can also be used. Conjugate- or variable-metric gradient methods depend on derivatives of the merit function and are not as convenient for this application.

At block 604, using a kernel density technique, the probability functions of the range, azimuth and trace speed can be estimated for an ensemble of single-solution results of the analytical seeding method. From each of these probability functions, their full-width half-maximum and median values can be estimated and used to construct a set of vertices for a seed simplex appropriate for the parameter space. For example, in the case of a 2-D array with static medium, the seed simplex derived from these quantities can be an irregular tetrahedron in (r, θ, c) space. Its base can be given by the triangle with vertices: $(r_{low}, \theta_{med}, c_{low})$, $(r_{high}, \theta_{low}, c_{low})$, $(r_{high}, \theta_{high}, c_{low})$; and its apex is given by $(r_{med}, \theta_{med}, c_{med})$.

Once the seed simplex derived from the analytical seed method is determined, the method can determine a localization by using an optimization procedure at block 605. The optimization procedure can be, for example, a Nelder-Mead minimization. By way of example, and not limitation, the method can perform a Nelder-Mead minimization on the "distance" δτ in a [n(n−1)/2]-dimensional space between the observed delay vector (EQ. 4) and a calculated delay vector, under model assumptions, arising from each of the vertices of the simplex. Since the mathematics of the Nelder-Mead method are more efficiently carried out in Cartesian space, each of the simplex vertices is first converted to Cartesian space.

The distance between two d-dimensional vectors a and b is generally defined according to the relation $$L_N = \left(\sum_{i=1}^{d}(a_i - b_i)^N\right)^{\frac{1}{N}} \tag{5}$$

Typically, distance is defined according to the L2 norm, or the Euclidean distance. The minimization carried out by the method can use the L1 and L∞ norms. The L1 norm modifies the definition of EQ. 5 slightly $$L_1 = \left|\sum_{i=1}^{d}(a_i - b_i)\right| \tag{6}$$

L1 can be used as a norm as it is less sensitive to outliers than the traditional L2 norm. Via EQ. 5 it can be seen that the L∞ norm replaces the sum by the maximum difference between any coordinate pairs in the vectors a and b. This technique is used because it is extremely computationally efficient and tends to give approximately normally distributed results for source localizations.

Each of the L1 and L∞ norm realizations of δτ is represented by a simplex that has contracted around some local minimum in Cartesian space representing a localization which gives a delay vector that is within some tolerance of the observed delay vector.

The output of the method can be three-fold: the two resulting simplexes from the L1 norm and L∞ norm based minimizations of δτ and the mean localization derived from the results of the seeding method. From among these an operator can decide which is a valid localization, or can use the results in concert to decide whether or not a realistic localization has been achieved.

It is important to emphasize that even though a search is conducted for locations in space and for signal trace speeds, this is not a grid search over a predetermined set of points. The minimization algorithm can be based upon a Nelder-Mead technique and can utilize a simplex of points which expands, contracts, and reflects through the space spanned by source location ([x, y] or [x, y, z]), signal trace speed (c), and, if needed, velocity of medium drift ([$w_x, w_y$] or [$w_x, w_y, w_z$]) until the point that minimizes δτ is found to within a specified tolerance. The method can find a minimum in δτ within a tolerance of $10^{-10}$ in one to two seconds for an array of 10 sensors or less. Once a location is determined, range and azimuth are calculated relative to the origin of the array coordinate system (although these results can be transformed into any coordinates desired).

A Monte Carlo approach can be used to estimate the uncertainties inherent in any source localization that uses an arbitrary array. In this approach, a synthetic data set is generated that simulates the sensor records, across the array, for a signal that was generated from a known source location. These synthetic signals may be calculated directly from time-of-flight considerations from the source to each sensor. For a given synthetic signal, an ensemble of like signals is generated by corrupting the calculated signal with random noise. A source localization is performed for each data set in the ensemble. A statistical analysis of the resulting ensemble of localizations provides an estimate of the uncertainty in the locator method. By varying the noise amplitude and characteristics, these uncertainties can be expressed as functions of those parameters. The locator method is insensitive to the actual synthetic signal characteristics (e.g., impulsive or periodic).

ii. Analytical 'Seeding' Method

The analytical seeding method is currently able to be applied to six cases: (i) a planar (2-D) array with a static medium, (ii) a planar (2-D) array with a medium drifting at an unknown, constant velocity, (iii) a planar (2-D) array with a medium drifting at a known constant velocity, (iv) a spatial (3-D) array with a static medium, (v) a spatial (3-D) array with a medium drifting at an unknown, constant velocity, and (vi) a spatial (3-D) array with a medium drifting at a known, constant velocity. For each case, a slightly different variant of the seeding method is used. However, each variant is derived from the same fundamental approach, but is constructed to be mathematically compatible with the above mentioned six cases.

Figure 7:
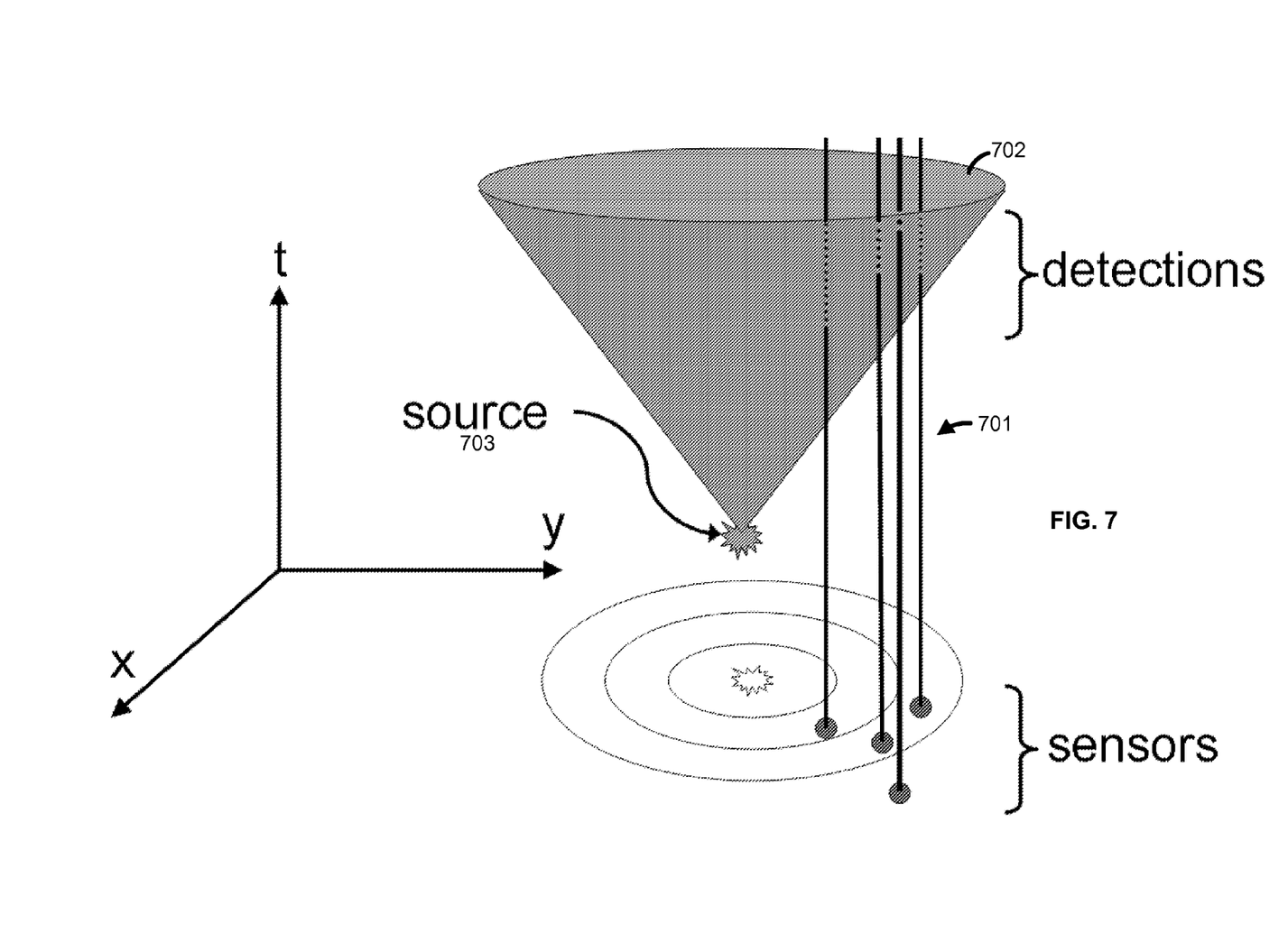
FIG. 7 is a space-time diagram depicting the detection of a signal by a planar array of four sensors.

For the sake of clarity, the fundamental approach of the seeding method is discussed with regards to case (i) as portrayed in FIG. 7. FIG. 7 is a space-time diagram depicting the detection of a signal by a planar array of four sensors. In this case, with a planar array and static medium, the signal propagating from a point source has the shape of a right, circular cone when plotted in (x,y,t) space. Since the sensors are at fixed positions, they are plotted in (x,y,t) space as vertical lines parallel to the time axis. Detections occur where and when the vertical lines 701 (sensors) intersect the cone 702 (signal). The detections can then be used to solve the equation of the cone and thus locate the source 703 of the signal. This is an approach of the analytical 'seeding' method as applied to a planar array in a static medium. Since four points are necessary to determine a right, circular cone uniquely, this problem reduces to a simpler mathematical problem: given four points (detections), find the equation of the cone that passes through them. Once solved, the vertex of the cone gives the location of the source $(x_s, y_s)$ and the time the signal was released $(t_s)$; the slope of the cone gives the signal's trace speed (c). This solution obtained from four sensors of an array can then be used as a starting point, or 'seed', for an algorithm which searches the neighboring region for the solution that best matches the time delays between detections of all sensor pairs in the array. It should be noted that on occasion, more than one cone exists that can pass through four points. In these cases, information from other sensors in the array is needed to determine a unique solution.

C. Alternative Methods of Operation

The Source Locator can be modified to make it more efficient as a sub-routine within the tracking method presented herein. For example, since the tracking method uses times of detection instead of time differences between detections, the "seeding method" can be applied only once to each sub-array instead of multiple times. Also, for an array of n sensors, the optimization process can use only a vector of n elements of time measurements within its merit function instead of a vector of $$\frac{n(n-1)}{2}$$

elements of time difference measurements. Another alternative in the case when the "seeding method" is only called once within the Source Locator (this occurs when there are only the minimum number of sensors needed to locate a source), is to return the estimate of the event time directly from the "seeding method" instead of re-calculating it again after the Source Locator has been executed.

While the methods and systems have been described in connection with preferred embodiments and specific examples, it is not intended that the scope of the methods and systems be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present methods and systems without departing from the scope or spirit. Other embodiments of the methods and systems will be apparent to those skilled in the art from consideration of the specification and practice of the methods and systems disclosed herein. It is intended that the specification and examples be considered as exemplary only, with a true scope and spirit of the methods and systems being indicated by the following claims.

What is claimed is:

1. A method for signal tracking comprising:
 a. receiving a signal from a moving signal source, at a sensor array;
 b. labeling a plurality of points of the signal, by a computer in communication with the sensor array;
 c. determining a location and a time for each of the plurality of the labeled points, by the computer; and
 d. determining a path and a velocity of the moving signal source from the determined locations and times, by the computer.

2. The method of claim 1, wherein the signal comprises a Doppler shifted signal.

3. The method of claim 1, wherein the signal is comprised of one of an infrasonic, acoustic, and electro-magnetic signal.

4. The method of claim 1, wherein labeling the plurality of points of the signal comprises labeling a start point, a finish point, and at least one zero crossing.

5. The method of claim 4, wherein the at least one zero crossing is a point where the received signal crosses through a value of zero pressure.

6. The method of claim 1, wherein the sensor array comprises four sensors.

7. The method of claim 6, further comprising repeating steps a-c for each sensor in the sensor array.

8. The method of claim 5, wherein determining a location and time for each of the plurality of the labeled points comprises determining a location and time for each of the start point, the finish point, and the at least one zero crossing.

9. A system for signal tracking comprising:
 a. a plurality of sensors for receiving a signal from a moving signal source; and
 b. a tracking unit, in communication with the plurality of sensors, comprising
  a sensor data receiving unit configured to receive signal data from the plurality of sensors,
  a signal labeling unit configured to label a plurality of points of the signal,
  a location and time determination unit configured to determine a location and a time for each of the plurality of the labeled points, and
  a path and velocity determination unit configured to determine a path and a velocity of the moving signal source from the determined locations and times.

10. The system of claim 9, wherein the signal comprises a Doppler shifted signal.

11. The system of claim 9, wherein the signal is comprised of one of an infrasonic, acoustic, and electro-magnetic signal.

12. The system of claim 9, wherein the signal labeling unit is configured to label a start point, a finish point, and at least one zero crossing.

13. The system of claim 12, wherein the at least one zero crossing is a point where the received signal crosses through a value of zero pressure.

14. The system of claim 9, wherein the tracking unit is configured to receive the signal from each of the plurality of sensors, label a plurality of points of the signal from each of the plurality of sensors, determine locations and times for each of the plurality of the labeled points from each of the plurality of sensors, and determine a path and a velocity of the moving signal source from the determined locations and times from each of the plurality of sensors.

15. The system of claim 12, wherein the path and velocity determination unit is configured to determine a location and time for each of the start point, the finish point, and the at least one zero crossing.

16. A computer readable medium with computer executable instructions embodied thereon for signal tracking comprising:
 a. receiving a signal from a moving signal source;
 b. labeling a plurality of points of the signal;
 c. determining a location and a time for each of the plurality of the labeled points; and
 d. determining a path and a velocity of the moving signal source from the determined locations and times.

17. The computer readable medium of claim 16, wherein labeling the plurality of points of the signal comprises labeling a start point, a finish point, and at least one zero crossing.

18. The computer readable medium of claim 16, further comprising repeating steps a-c for each sensor in the sensor array.

19. The computer readable medium of claim 18, wherein determining a location and time of the labeled points comprises determining a location and time for each of the start point, the finish point, and the at least one zero crossing.

* * * * *